May 17, 1966 T. G. GLEASON 3,251,176
LIQUID ELIMINATOR FOR GAS SCRUBBERS OR THE LIKE
Filed Feb. 8, 1963 2 Sheets-Sheet 1
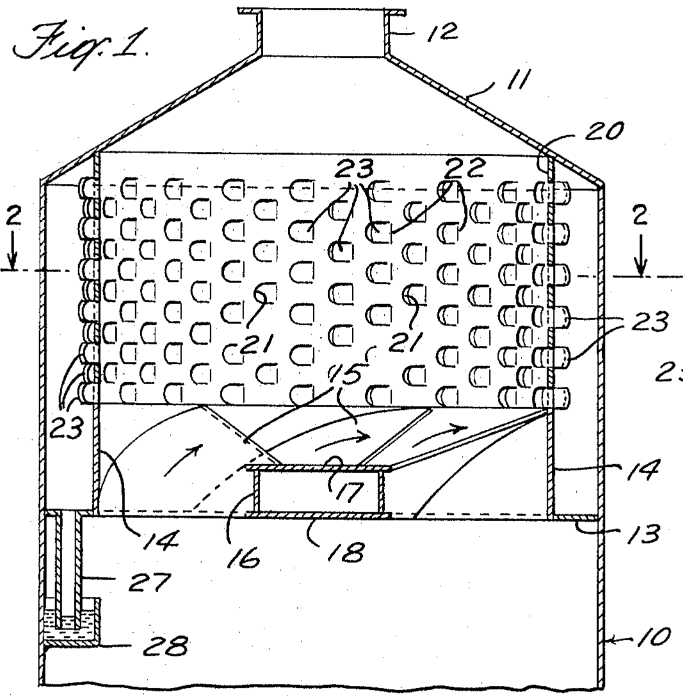
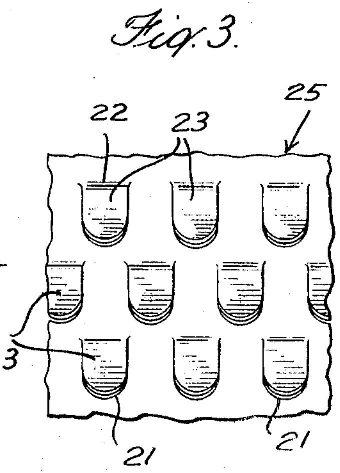
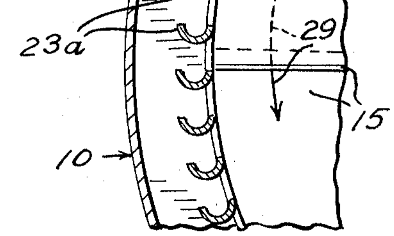
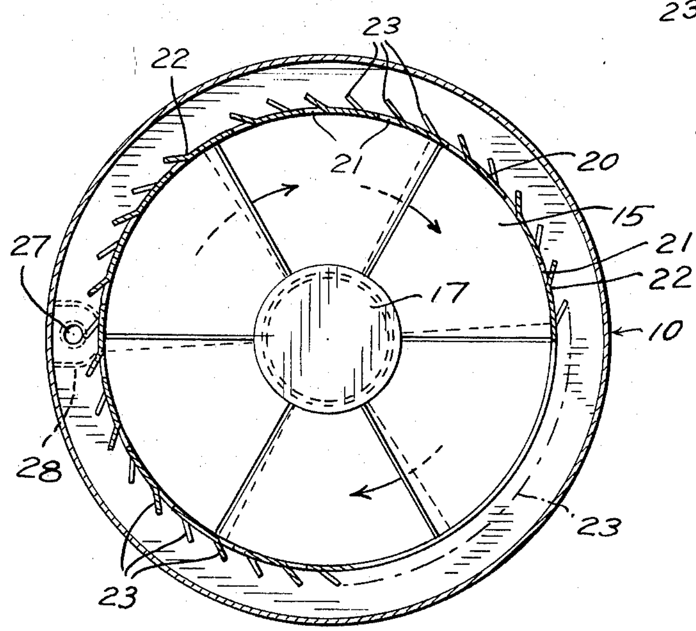
INVENTOR
THOMAS G. GLEASON
BY
ATTORNEY LIQUID ELIMINATOR FOR GAS SCRUBBERS OR THE LIKE
Filed Feb. 8, 1963
2 Sheets-Sheet 2
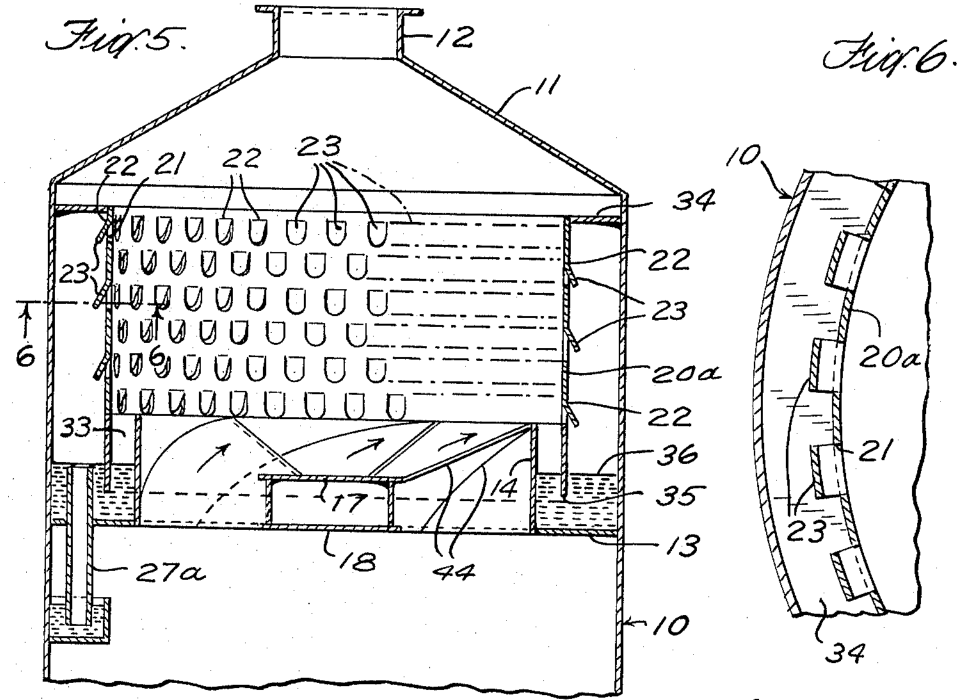
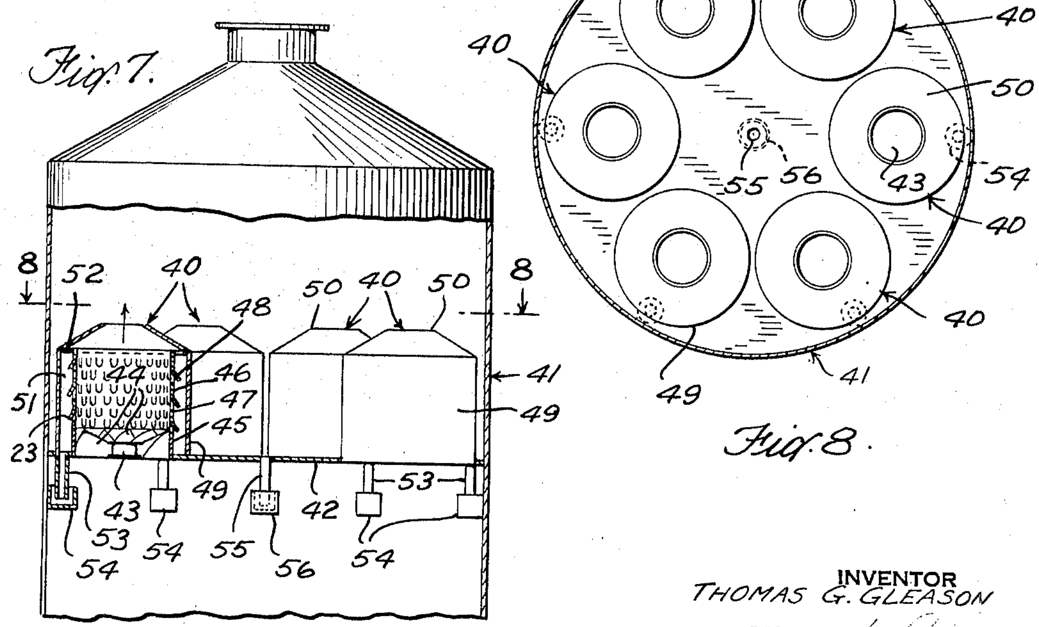
INVENTOR
THOMAS G. GLEASON
BY
ATTORNEY United States Patent Office 3,251,176

Patented May 17, 1966

3,251,176

LIQUID ELIMINATOR FOR GAS SCRUBBERS OR THE LIKE

Thomas G. Gleason, Manhasset, N.Y. (% Peabody Engr. Corp., 232 Madison Ave., New York 16, N.Y.)

Filed Feb. 8, 1963, Ser. No. 257,148
1 Claim. (Cl. 55—355)

This invention relates to gas scrubbers or the like and more particularly to the liquid eliminator zone of such apparatus.

An object is to provide a liquid eliminator zone of the above type having improved characteristics.

Another object is to provide a liquid eliminator of the type wherein the gases are passed through a set of vanes to cause rotation of the gases and removal of the entrained liquid droplets by centrifugal force, having improved means to separate the droplets from the gas stream and to prevent reentrainment of such separated droplets.

A further object is to improve the operating efficiency of the eliminator stage of such a device whereby the rate of gas flow may be substantially increased for an eliminator of given cross-sectional area.

Various other objects and advantages will be apparent as the nature of the invention is more fully disclosed.

In a liquid eliminator stage of the type shown for example in Graham Patent No. 2,457,658 wherein the rising gases are passed between a set of radial vanes disposed within an eliminator unit having an outer cylindrical wall terminating upwardly in a conical wall, it is possible for gas and droplet flow from the vanes of the eliminator to impinge on either the solid cylindrical or solid conical portion of the outer wall or shell of the eliminator element or of the scrubber as the case may be.

In such cases droplets impinging on the vertical wall or on the conical outlet tend to agglomerate and it has been found that above certain gas velocities through the scrubber and eliminator a substantial part of such agglomerated liquid is reentrained and passes out with the exit gas so that the eliminator does not perform at maximum efficiency.

Such liquid droplets as are not reentrained fall or flow into the annulus between the cylindrical casing around the eliminator vanes and the outer shell of the eliminator element and are removed by a drain or drains discharging into a water seal to prevent the upward flow of gas therethrough.

In accordance with the present invention the eliminator stage is provided with means for preventing the droplets from being reentrained after they have been removed centrifugally from the rising gas stream. This is accomplished by providing the eliminator with a perforated cylindrical wall through which the droplets pass into an annular space wherein they are shielded from the gas stream. In the case of a scrubber having a single set of eliminator vanes disposed concentrically within its outer shell the annular space is provided between the perforated cylindrical wall and the scrubber shell. In the case of a scrubber having a plurality of eliminator units the annular space is formed between the perforated cylindrical wall of each unit and its solid outer shell. This annular space is closed at the top and bottom so that no appreciable gas flow can take place therein for reentraining the droplets which are collected in such space.

The eliminator is capable of general use although it is described herein specifically as applied to a gas scrubber.

The nature of the invention will be better understood from the following description, taken in connection with the accompanying drawings in which certain specific embodiments are set forth for purposes of illustration.

In the drawings:

FIG. 1 is a partial vertical section through the upper portion of a scrubber tower employing a single eliminator embodying the invention;

FIG. 2 is a horizontal section taken on the line 2—2 of FIG. 1;

FIG. 3 is a partial detail view showing the blank from which the perforated cylinder is formed;

FIG. 4 is a detail sectional view illustrating another type of lip embodied in the perforated cylindrical wall;

FIG. 5 is a partial vertical section similar to FIG. 1 illustrating a further embodiment of the invention;

FIG. 6 is a partial horizontal section taken on the line 6—6 of FIG. 5, but on a larger scale;

FIG. 7 is a partial vertical section, similar to FIG. 1 illustrating an embodiment utilizing a plurality of eliminator units; and FIG. 8 is a horizontal section taken on the line 8—8 of FIG. 7.

Referring to the drawings more in detail, the invention is shown as applied to a gas-liquid contact apparatus of the type illustrated in the Graham Patent above mentioned which shows a plurality of gas-liquid contact zones and a liquid eliminator zone wherein the gases with entrained droplets are passed through a series of vanes adapted to cause rotation of the gases whereby the liquid droplets are removed centrifugally. Only so much of the apparatus is shown herein as is necessary for an understanding of the scrubber.

Referring to FIGS. 1 and 2, the outer shell 10 of the scrubber is provided with a conical top portion 11 terminating in a discharge opening 12. The elminator zone includes an annular plate 13 attached to the shell 10 at its outer periphery and carrying at its inner periphery a solid cylindrical wall 14 to which are secured the outer ends of a plurality of vanes 15 attached at their inner ends to a hub rim 16 which is closed at the top and bottom by plates 17 and 18. A perforated wall 20 is carried on and forms an extension of the cylindrical wall 14 and may be secured thereto by a suitable means as by welding. The perforated wall 20 extends upwardly to engage and form a closure with the conical section 11 of the outer shell 10. The wall 20 is formed with a plurality of perforations 21. The perforations 21 are shown as formed by striking out tabs from the wall 20 which are bent outwardly about hinge lines 22 which are shown as vertical in FIGS. 1 and 2 to form lips 23. In FIGS. 1 and 2 the vanes 15 are adapted to cause clockwise rotation of the upwardly passing gases and the lips 23 extend outwardly in a counter clockwise direction so that the rotating gases impinge thereon with a change in direction as they pass through the perforations 21. The perforations 21 are arranged in a series of rows which may be staggered to provide for a uniform interception of the droplets which impinge on the wall 20.

The wall 20 may be made from a flat blank 25 as shown in FIG. 3 which may be rolled into cylindrical form with the lips 23 extending circumferentially as shown in FIG. 2 or downwardly as shown in FIG. 5, or outwardly in a clockwise direction as shown in FIG. 4. In FIG. 4 the lips *23a* are shown as initially curved counter clockwise in horizontal section and the direction of rotation of the gases is counter clockwise as indicated by the arrow 29.

The liquid droplets which pass through the perforations 21 collect on the plate 13 and are drained through drain pipe 27 into a liquid seal formed by a layer of liquid in a cup 28 carried by the shell 10 below the plate 13 from which the liquid overflows onto the trays below.

In FIGS. 5 and 6 the construction is similar to that of FIG. 1 except that the perforated wall *20a* is disposed outside of and concentric with the wall 14 to provide an annular space 33 therebetween. The portion of the wall *20a* in radial alignment with the wall 14 is imperforate and provides a zone in which the liquid is shielded from the gas stream within the wall 14. In this embodiment the wall 20*a* terminates below the cone portion 11 of the shell 10 and the annulus between the wall 20*a* and the shell 10 is closed by an annular plate 34. This plate is attached to the outer shell and supports the wall 20*a* with its bottom edge 35 spaced above the surface of the plate 13, but below the level of the liquid blanket 36 which is maintained on the plate 13. The drain pipe 27*a* extends above the level of the plate 13 to determine the thickness of the liquid blanket thereon.

In the form of FIGS. 7 and 8 a plurality of separator units 40 are disposed over the area of the scrubber within the shell 41 and are carried by a support plate 42. Each unit includes a closed hub 43 carrying a plurality of vanes 44 having their outer ends secured in an annular wall 45. A perforated cylindrical wall 46 extends above the wall 45 and has a plurality of perforations 47 with lips 48. An outer casing 49 surrounds the wall 45 and cylinder 46 terminating in a conical outlet portion 50. The annular space 51 between the wall 46 and the casing 49 is closed by an annular plate 52. The annular space 51 is drained by a drain pipe 53 which forms a liquid seal with a layer of liquid in a cup 54 which overflows onto the tray below. The plate 42 is drained by a pipe 55 having its lower end disposed in a liquid seal in a cup 56.

In all of the various embodiments described above the rotating gases tend to throw out centrifugally liquid droplets which are entrained therein. These droplets pass outwardly through the perforations in the perforated cylinder and are collected in the annular space between this cylinder and the outer shell. In this annular space they are shielded from the rotating gases so that they are not reentrained therein. Also the annular space is closed at the top by the outer shell or by the annular plate and is closed at the bottom by the support plate. Hence there is no gas flow through this space which can pick up the liquid. The liquid drains from the support plate or from the liquid blanket therein onto the trays below without coming into contact with the gases rising from the eliminator.

It has been found that the above construction permits the gas flow to be increased to several times the usual velocity without causing reentrainment of the droplets with a consequent increase in eliminator efficiency. The quantity of gases passing through a given scrubber may be increased or the size of scrubber for a given gas volume may be correspondingly reduced.

What is claimed is:

Apparatus for removing entrained liquid droplets from gases comprising an outer vertical shell having a vertical axis, a vertical cylindrical wall perforated for only the upper part of its length and imperforate for the lower part of its length, thus defining an imperforate bottom end of said wall, said perforated part being formed by striking out a plurality of tabs from said wall, said tabs being bent outwardly from said wall, said wall being spaced inwardly from said shell, said wall forming a tube for the flow of gas axially therethrough and having open ends in axial alignment with the vertical axis of said shell, said wall and said shell forming therebetween a first annular space, said wall at its upper end being mechanically sealed around its entire periphery to said shell, a horizontal annular disc spaced vertically below the imperforate bottom end of said wall and mechanically sealed around its entire outer periphery to said shell, a short imperforate vertical cylinder spaced radially inward from said wall mechanically sealed around its entire periphery to the inner periphery of said disc, said cylinder extending vertically upward from said disc above the bottom end of said wall to form between said cylinder and said wall a second annular space, said cylinder and said shell forming the sides of an annular trough for the collection and retention of a liquid layer on said disc, an imperforate hub at said axis of said shell and spaced within but apart from said cylinder for defining a third annular space between said hub and said cylinder thereby forming a flow passage for droplet-bearing gas, a set of thin curved radial vanes spanning said flow passage, the outer ends of said vanes being supported by said cylinder, said hub and vanes being disposed below the perforations in said wall, said vanes being shaped to impart rotational movement to the droplet-bearing gases passing therebetween and being adapted to cause said entrained droplets to pass through the perforations of said wall by centrifugal action and to collect and form a liquid layer in said annular trough, the lower imperforate end of said wall being spaced vertically above said disc and below the upper end of said cylinder for immersion in said liquid layer thereby forming a first liquid seal between the bottom of said wall and said shell for completing the closure of said first annular space against gas flow therethrough, and liquid discharge means including a vertical drain pipe having a second liquid seal at its bottom end for preventing gas flow therethrough, drain pipe being mounted in said disc between said shell and said wall and extending through and below said disc, said pipe also extending vertically upward from said disc and terminating at a point spaced above said disc and above the bottom of said wall but below the top of said cylinder to maintain a desired thickness of a liquid layer in said trough and to remove liquid from said trough in excess of that required to maintain said first liquid seal and to discharge said liquid into the droplet bearing gas stream below said vanes.

References Cited by the Examiner

UNITED STATES PATENTS

| | | | |
|---|---|---|---|
| 385,037 | 6/1888 | Ash | 55—398 |
| 1,539,435 | 5/1925 | Schutz | 55—454 |
| 1,770,774 | 7/1930 | Hackett | 55—204 |
| 1,783,813 | 12/1930 | Schneible | 55—398 X |
| 1,789,717 | 1/1931 | Walker | 55—424 X |
| 1,846,248 | 2/1932 | Clarke | 55—456 |
| 2,214,658 | 9/1940 | Browning | 55—398 |
| 2,226,127 | 12/1940 | Harmon | 55—457 X |
| 2,418,381 | 4/1947 | Wegmann | 55—398 X |
| 2,425,588 | 8/1947 | Alexander | 55—398 |
| 2,457,658 | 12/1948 | Graham | 261—114 X |
| 2,560,077 | 7/1951 | Bloomer et al. | 55—228 X |
| 2,756,976 | 7/1956 | Jalma | 55—235 X |
| 2,970,671 | 2/1961 | Warner | 55—455 X |
| 3,048,956 | 8/1962 | Lundy et al. | 55—235 |

FOREIGN PATENTS

| | | |
|---|---|---|
| 333,820 | 3/1921 | Germany. |
| 8,134/14 | 3/1914 | Great Britain. |
| 436,191 | 10/1926 | Great Britain. |
| 901,290 | 7/1962 | Great Britain. |

HARRY B. THORNTON, *Primary Examiner.*

D. TALBERT, L. H. McCARTER, *Assistant Examiners.*